United States Patent Office 3,099,619
Patented July 30, 1963

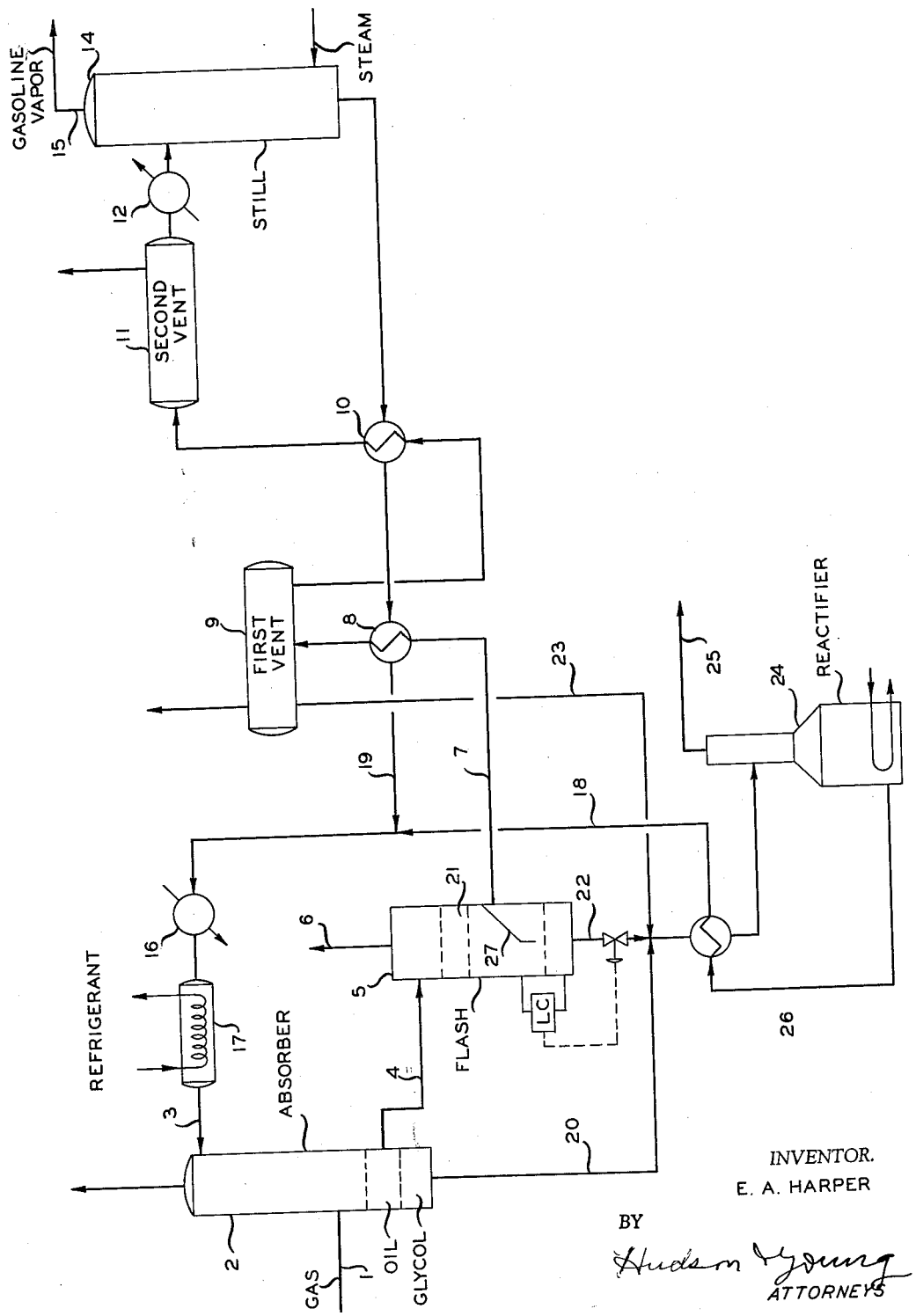

3,099,619
LOW TEMPERATURE ABSORPTION OF GASOLINE CONSTITUENTS FROM NATURAL GAS
Ernest A. Harper, Bartlesville, Okla., assignor to Phillips Petroleum Company, a corporation of Delaware
Filed Mar. 7, 1960, Ser. No. 13,249
7 Claims. (Cl. 208—341)

This invention relates to a low temperature absorption of gasoline constituents from natural gas. In one of its aspects, the invention relates to a method for the removal of natural gasoline constituents from natural gas by contacting the same with an absorption oil containing an agent which prevents formation of hydrocarbon hydrates during the absorption step. In another of its aspects, the invention relates to a method of contacting natural gas with a refrigerated lean oil containing a glycol, which has the property of preventing the formation of hydrocarbon hydrates in the absorption step.

The formation of hydrocarbon hydrates at low temperatures is well known.

Ordinarily, the operation of a low temperature gas absorption, in which lean oil fed to a gas absorber is chilled, requires removal of water from the oil and/or from the gas being absorbed if hydrate formation is to be avoided together with its concomitant disadvantages which are also known in the art, such as the clogging and rendering inoperative of various equipment and lines.

I have now conceived a modus operandi for the absorption of gasoline constituents from natural gas, which permits the use of an absorption system in which water can be present, yet in which system hydrocarbon hydrate formation is avoided by utilizing in the system a lean oil to which a glycol or equivalent freezing point depressant is added before it is refrigerated and used in the absorber of the system. Further, I have conceived a combination of steps permitting the embodying of the basic concept of the invention, the said combination being based on additional or related concepts which are apparent from this description, the drawing, and the appended claims.

It is an object of this invention to provide a method for the absorption of gasoline constituents from natural gas. Another object of this invention is to provide a natural gas absorption method in which the absorption oil which is used and/or the gas need not be dehydrated in order to avoid the formation of hydrocarbon hydrates. It is a further object of this invention to provide a method involving a combination of steps which permits the utilization of a lean oil and/or a natural gas which contains water in an absorption step. It is a further object of the invention to provide a modified lean absorber oil.

Other aspects, objects, and the several advantages of the invention are apparent from a study of the disclosure, the drawing, and the appended claims.

According to the present invention, a natural gas is treated in an absorption zone with a refrigerated lean oil, to which oil there has been added a glycol, for example, diethylene glycol.

Also according to the invention there is provided a combination of steps essentially consisting of adding a glycol to a lean oil, refrigerating the lean oil, contacting a natural gas with the thus modified lean oil in an absorption zone, obtaining a residue gas and a rich absorption oil, allowing phase separation of the rich oil to occur, obtaining essentially a rich oil phase and a glycol-water phase, the water resulting from any water in the lean oil and/or the natural gas contacted therewith, removing the rich oil phase to a flash zone, in said flash zone, flashing hydrocarbon vapors from the rich oil, removing any aqueous glycol phase from said flash zone, removing a flashed, rich oil phase from said flash zone, venting said flashed, rich oil phase to remove further vapors therefrom, stripping said flashed and now vented oil phase to recover gasoline constituents therefrom, removing from said absorption zone said glycol-water phase, passing said last-mentioned phase to a reactifier zone, in said zone removing water from said phase and returning a concentrate-glycol for reuse as described.

Referring now to the drawing, natural gas is passed by line 1 into absorber 2. Absorption oil, kerosene, passes by line 3 into absorber 2. Rich oil flows from absorber 2 by line 4 into flash zone 5. The flashed vapors from zone 5 pass by line 6 and can be further processed in a re-absorber. Rich oil flows by line 7 and heat exchanger 8 into vent tank 9 and from vent tank 9 through heat exchanger 10 into vent tank 11. The rich oil flows from vent tank 11 through heat exchanger 12 into still 14. The natural gasoline vapors are stripped from the rich oil and are taken off as overhead by line 15. Lean oil from the bottom of still 14 passes through heat exchangers 10, 8, 16, and 17. Diethylene glycol is passed by line 18 into lean oil line 19. The ethylene glycol reduces the freezing point of the water contained in the lean oil. The glycol separates from the rich oil in the bottom of absorber 2 and is drained through line 20. Some glycol entrained in the rich oil flows into flash zone 5. The glycol, having a very low vapor pressure, passes with the rich oil down through the coalescing material 21 in flash zone 5. The coalescing material 21 is wood shavings, wire screen or similar materials used for coalescing liquid entrained in gas or another liquid. The coalesced glycol separates from the rich oil and is removed from the bottom of flash zone 5 by line 22. Some entrained glycol may pass into vent tank 9 and is removed by line 23. The glycol that passes through lines 20, 22, and 23 is passed into reactifier 24. Water is stripped from the glycol and is passed by line 25 in the form of vapor. The partially dehydrated glycol is passed from reactifier 24 by line 26 into line 19 through which lean oil flows. The vented and flashed vapors can be processed in a re-absorber.

Flash zone 5 has a baffle 27 to inhibit the flow of glycol which is descending in tower 5 through line 7. Coalescing material 21 can be dispensed with when not absolutely needed.

If desired, as an alternative operation, in lieu of taking off glycol by pipe 20 from absorber 2, all of the bottoms from this absorber can be passed to flash zone 5, in which event the glycol phase will pass by pipe 22 to the reactifier.

In a specific embodiment of the invention, gas enters through line 1 at 500 p.s.i.g., 80° F., and 60,000,000 c.f.d. Oil enters absorber 2 at 1,200,000 gpd, 20° F., 44 API, and contains 0.06 percent water by volume.

The lean diethylene glycol contains 30 percent water by volume and is added to the lean oil at the rate of 7 g.p.m. The rich glycol contains 35 percent water by volume.

The vapor flashed in vessel 5 is mostly methane and ethane with small concentrations of the higher boiling hydrocarbons up to six or seven carbon atoms per molecule. The vapors vented in the first and second vents contain lower concentrations of methane and ethane and slightly higher concentrations of higher boiling hydrocarbons. It is desirable to vent the flash and vent tanks, since this considerably decreases the vapor load in the still. This allows a still to be used that is very much smaller in diameter than if the flashed vapors were passed through the still. If the velocity of vapors through the still is excessive, the oil carried out of the still with the vapors will also be excessive. If the vapors are not vented, the efficiency of the heat-exchangers is reduced substantially.

One skilled in the art in possession of this disclosure will be able to adapt the invention to obtain the results which are herein indicated and will be able to determine by mere routine test the precise operating conditions which are best suited to his particular lean oil and/or natural gas.

The glycols used in the present invention can be ethylene glycol, $CH_2OHCH_2OH$, diethylene glycol, $$CH_2OHCH_2OCH_2CH_2OH$$

or triethylene glycol, $$CH_2OHCH_2OCH_2CH_2OCH_2CH_2OH$$

The lower the molecular weight of glycol, the higher the vapor pressure of the glycol. When operating at temperatures from 0 to −20° F., either ethylene glycol or diethylene glycol, or a mixture of these glycols, can be added to the lean oil. At temperatures from 0 to 10° F. or higher, it is not usually desirable to add ethylene glycol to the lean oil, because of loss of the ethylene glycol in the residue gas from the absorber. When using lean oil at temperatures of 0 to 25 or 30° F., it is desirable to use either diethylene glycol or triethylene glycol.

The lower the molecular weight of the glycol, the less soluble is the glycol in lean oil. For this reason, the glycol should have as low a molecular weight as practical as long as the loss of glycol in the residue gas from the absorber is not excessive.

The rate of addition of the glycol to the lean oil depends at least upon the (1) concentration of water in the lean oil, (2) the concentration of water in the gas fed to the absorber, (3) the molecular weight of the glycol, (4) the concentration of water in the glycol, and (5) the temperature in the absorber. When the concentration of water in either the gas feed for the absorber and/or in the lean oil passing into the absorber is increased, the molecular weight of the glycol is preferably increased and/or the concentration of water in the glycol or the temperature in the absorber is decreased. It is also possible to increase the rate of addition of the glycol. Enough glycol is added that hydrates are not formed in the absorber.

It is desirable to keep the concentration of water in the lean glycol as high as possible without having to add an excessive amount of lean glycol to the lean oil. It is usually desirable to have about 60–80 percent water in the lean glycol and add enough of the lean glycol to the lean oil that the rich glycol will contain from 5–10 percent more water than the lean glycol. However, it is possible to add a more highly concentrated lean glycol to the lean oil and use only enough glycol that it will become diluted to a low concentration. The higher the concentration of water in the glycol, the less viscous the glycol and the lower the solubility in rich oil. It is also easier to strip water from a more dilute solution of glycol. For these reasons, it is desirable to use as high a concentration of water in the glycol as possible without having to circulate too large a volume of glycol and still have the concentration of the glycol high enough that hydrates will not be formed in the absorber.

Reasonable variation and modification are possible within the scope of the foregoing disclosure, the drawing, and the appended claims to the invention the essence of which is that a glycol has been added to lean oil in a natural gas absorption to avoid formation of hydrocarbon hydrates and that a combination of steps for working with a lean oil modified according to the invention has also been set forth.

I claim:

1. A method for the removal of gasoline constituents from a natural gas by contacting the same with a lean oil when water is present during the contacting which comprises adding a glycol to the lean oil before it is used in said contacting, the glycol being of a character and added in an amount such that formation of hydrocarbon hydrates during said contacting is inhibited and said amount being such that after said contacting, phase separation can occur to form a rich oil phase and a glycol-water phase and then contacting said lean oil, thus modified, and said natural gas while said lean oil contains said glycol.

2. A method according to claim 1 wherein the glycol is diethylene glycol.

3. In a method, a combination of steps essentially consisting of adding a glycol to a lean oil before it is used as herein specified, refrigerating the lean oil, contacting a natural gas with the thus modified lean oil while it contains said added glycol in an absorption zone, obtaining a residue gas and a rich absorption oil, allowing phase separation of the rich oil to occur, obtaining essentially a rich oil phase and a glycol-water phase, the water at least in part resulting from water in the lean oil and/or the natural gas contacted therewith, removing the rich oil phase to a flash zone, and in said flash zone, flashing hydrocarbon vapors from the rich oil the amount of glycol added being sufficient so that said phase separation can occur.

4. A method according to claim 3 wherein the aqueous glycol phase which is formed in the absorption zone is removed therefrom, treated to remove water therefrom, and the glycol thus treated is reused.

5. In a method, a combination of steps essentially consisting of adding a glycol to a lean oil before it is used as herein specified, refrigerating the lean oil, contacting a natural gas with the thus modified lean oil while it contains the added glycol in an absorption zone, obtaining a residue gas and a rich absorption oil, allowing phase separation of the rich oil to occur, obtaining essentially a rich oil phase and a glycol-water phase, the water resulting from water at least in part in the lean oil and/or the natural gas contacted therewith, removing the rich oil phase to a flash zone, in said flash zone, flashing hydrocarbon vapors from the rich oil, removing the glycol-water phase to a reactifier zone, in said reactifier zone, removing water from said phase obtaining a glycol of lowered water content, and returning said glycol of lowered water content for reuse as herein described, the amount and character of the added glycol being such that said phase separation can occur.

6. An apparatus suitable for the absorption of gasoline constituents from a natural gas employing a lean oil under conditions in which water is present, the lean oil having been modified with a freezing point depressant such as a glycol comprising, in combination as follows: an absorber, means for passing a refrigerated, modified lean oil to said absorber, means for passing a natural gas to said absorber, means for removing enriched oil from said absorber, a flash vessel, means for passing removed, enriched oil to an upper portion of said flash vessel, means for removing from said flash vessel, at a locus above said means for passing removed, enriched oil to an upper portion of said flash vessel, vapors flashed from said enriched oil, means at an intermediate level in said flash vessel for removing flashed, rich oil therefrom, means at said level to substantially entirely prevent liquid glycol descending past said level in said vessel from passing out of said vessel with removed flashed, rich oil, said means permitting glycol to descend past said level in said vessel, flashed, rich oil being removed from said vessel by said means for removing flashed, rich oil from said flash vessel, means upon said flash vessel for maintaining a level of aqueous phase in the bottom of said flash vessel and for preventing the upper surface of said aqueous phase from rising to the level of said means for removing flashed, rich oil from said flash vessel and means for removing aqueous phase from said flash vessel.

7. An apparatus according to claim 6 wherein in said flash vessel, intermediate the point of entry of rich oil into said flash vessel and the point of removal of flashed, rich oil therefrom, there is provided a coalescing means adapted to coalesce the freezing point depressant, thus aiding the formation of the aqueous phase.

References Cited in the file of this patent

UNITED STATES PATENTS

| | | |
|---|---|---|
| 1,937,871 | Cox | Dec. 5, 1933 |
| 2,297,675 | Dayhuff et al. | Oct. 6, 1942 |
| 2,299,830 | Legatski et al. | Oct. 27, 1942 |
| 2,603,310 | Gilmore | July 15, 1952 |
| 2,758,665 | Francis | Aug. 14, 1956 |
| 2,771,149 | Miller et al. | Nov. 20, 1956 |
| 2,784,806 | Ferro | Mar. 12, 1957 |
| 2,873,814 | Maher | Feb. 17, 1959 |
| 2,919,766 | Dillman et al. | Jan. 5, 1960 |
| 2,927,061 | Stover | Mar. 1, 1960 |
| 2,974,100 | Mitchell | Mar. 7, 1961 |
| 2,982,722 | Gish | May 2, 1961 |